(12) United States Patent
Iizuka

(10) Patent No.: US 8,363,906 B2
(45) Date of Patent: Jan. 29, 2013

(54) METHOD, APPARATUS, AND COMPUTER READABLE STORAGE MEDIUM FOR BIOMETRIC IMAGE EXTRACTION, REGISTRATION, AND CORRELATION

(75) Inventor: Ken Iizuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1072 days.

(21) Appl. No.: 12/281,078

(22) PCT Filed: Feb. 28, 2007

(86) PCT No.: PCT/JP2007/054378
§ 371 (c)(1),
(2), (4) Date: Dec. 22, 2008

(87) PCT Pub. No.: WO2007/100145
PCT Pub. Date: Sep. 7, 2007

(65) Prior Publication Data
US 2009/0245592 A1  Oct. 1, 2009

(30) Foreign Application Priority Data

Feb. 28, 2006 (JP) ................................ 2006-052887

(51) Int. Cl.
*G06K 9/00* (2006.01)
(52) U.S. Cl. .................... 382/115; 382/217; 382/281
(58) Field of Classification Search .................. None
See application file for complete search history.

(56) References Cited

U.S. PATENT DOCUMENTS

| 7,747,103 | B2 * | 6/2010 | Iizuka | 382/278 |
| 2002/0028004 | A1 * | 3/2002 | Miura et al. | 382/124 |
| 2005/0111738 | A1 * | 5/2005 | Iizuka | 382/190 |
| 2005/0180636 | A1 * | 8/2005 | Iizuka | 382/217 |
| 2008/0247622 | A1 * | 10/2008 | Aylward et al. | 382/131 |

FOREIGN PATENT DOCUMENTS

| JP | 7 121722 | 5/1995 |
| JP | 2005-115615 | 4/2005 |

* cited by examiner

*Primary Examiner* — Bhavesh Mehta
*Assistant Examiner* — Tahmina Ansari
(74) *Attorney, Agent, or Firm* — Oblon, Spivak, McClelland, Maier & Neustadt, L.L.P.

(57) ABSTRACT

To provide a registration apparatus, a collation apparatus, an extraction method and an extraction program capable of improving authentication accuracy. An image signal obtained by imaging a biometric subject in a predetermined biological position is subjected to predetermined processing so as to extract a feature portion of the biometric subject in the image signal. The feature portion is subjected to Hough transform. Parameter extraction is performed by changing the extraction condition such that the number of parameters obtained by the Hough transform becomes a predetermined value. In the case where the value of the extraction condition at the time point when the number of parameters is the predetermined value falls within a range from the upper limit set value to the lower limit set value, the predetermined number of parameters are set as registration data or data to be collated with the registration data.

15 Claims, 7 Drawing Sheets

METHOD, APPARATUS, AND COMPUTER READABLE STORAGE MEDIUM FOR BIOMETRIC IMAGE EXTRACTION, REGISTRATION, AND CORRELATION

TECHNICAL FIELD

The present invention relates to a registration apparatus, a collation apparatus, an extraction method and an extraction program which are desirably employed in biometrics authentication.

BACKGROUND ART

In performing biometrics authentication, there are used blood vessels as a subject to be authenticated. There has been proposed, as an authentication apparatus using blood vessels as a subject to be authenticated, an apparatus that uses parameters obtained by Hough-transforming digitized image data obtained as a result of imaging a finger as registration data or data to be collated with registration data (refer to, e.g., Patent Document 1).

This authentication apparatus focuses on the fact that the blood vessels in the image have high linearity and adopts a Hough transform scheme capable of quantifying a linear component dominating in the image as parameters, thereby reducing redundant information, as well as improving authentication accuracy.

Patent Document 1: Jpn. Pat. Appln. Laid-Open Publication No. 2005-115615

However, in such an authentication apparatus, in the case where the amount of a blood vessel component in image data obtained as an imaging result is small or amount of a noise component in the image data is substantially large, even if data obtained by performing Hough transform for the image data is used as registration data or data to be collated with registration data, characteristics of the Hough transform are not sufficiently reflected in the authentication processing, resulting in a decrease in the authentication accuracy.

On the other hand, in recent years, a compact construction has been desired for the authentication apparatus and, in view of the downsizing, the apparatus preferably has a simple structure.

DISCLOSURE OF THE INVENTION

The present invention has been made in view of the above points, and an object thereof is to propose a registration apparatus, a collation apparatus, an extraction method and an extraction program capable of improving authentication accuracy with a simple structure.

To solve the above problem, according to a first aspect of the present invention, there is provided a registration apparatus including: a feature extraction means for performing predetermined processing for an image signal obtained as a result of imaging a biometric subject in a predetermined biological position so as to extract a feature portion of the biometric subject in the image signal; a Hough transform means for performing Hough transform for the feature portion; an extraction means for extracting a parameter obtained as a result of the Hough transform while changing an extraction condition such that the number of the parameters becomes a predetermined value; and a registration means for registering the predetermined number of the parameters as biometric information in the case where the value of the extraction condition at the time point when the number of the parameters is the predetermined value falls within a range between the upper limit set value and lower limit set value.

Thus, in the registration apparatus, it is possible to determine the quality of the image signal according to the value of the extraction condition at the time point when a certain number of parameters are extracted. As a result, in the case where the image signal contains an insufficient amount of a component corresponding to a biometric subject or where the image signal contains an excessive amount of a noise component other than the biometric subject, it is possible to prevent the parameter obtained from such an image signal from being registered as the biometric information. On the other hand, in the case where the image signal has satisfactory quality, a parameter exhibiting adequate discrimination is extracted based on the image signal and is registered as the biometric information. Thus, in the registration apparatus, authentication accuracy can be improved.

Further, in the registration apparatus, Hough transform is used not only as a factor for generating biometric information but also as a factor for use in determining the quality of the image signal, thereby simplifying the configuration of the registration apparatus.

Further, according to a second aspect of the present invention, there is provided a collation apparatus including: a feature extraction means for performing predetermined processing for an image signal obtained as a result of imaging a biometric subject in a predetermined biological position so as to extract a feature portion of the biometric subject in the image signal; a Hough transform means for performing Hough transform for the feature portion; an extraction means for extracting a parameter obtained as a result of the Hough transform while changing an extraction condition such that the number of the parameters becomes a predetermined value; and a collation means for collating the predetermined number of the parameters with a parameter registered as biometric information in the case where the value of the extraction condition at the time point when the number of the parameters is the predetermined value falls within a range between the upper limit set value and lower limit set value.

Thus, in the collation apparatus, it is possible to determine the quality of the image signal according to the value of the extraction condition at the time point when a certain number of parameters are extracted. As a result, in the case where the image signal contains an insufficient amount of a component corresponding to a biometric subject or where the image signal contains an excessive amount of a noise component other than the biometric subject, it is possible to prevent the parameter obtained from such an image signal from being collated with the registered parameter. On the other hand, in the case where the image signal has satisfactory quality, in the collation apparatus, a parameter exhibiting adequate discrimination is extracted from the image signal and is collated with the registered parameter. Thus, authentication accuracy can be improved.

Further, in the collation apparatus, the Hough transform is used not only as a factor for generating biometric information but also as a factor for use in determining the quality of the image signal, thereby simplifying the configuration of the registration apparatus.

Further, according to a third aspect of the present invention, there is provided an extraction method including: a first step of performing predetermined processing for an image signal obtained as a result of imaging a biometric subject in a predetermined biological position so as to extract a feature portion of the biometric subject in the image signal; a second step of performing Hough transform for the feature portion; a third step of extracting a parameter obtained as a result of the Hough transform while changing an extraction condition such that the number of the parameters becomes a predetermined value; and a fourth step of setting the predetermined number of the parameters as registration data or data to be collated with the registration data in the case where the value of the extraction condition at the time point when the number of the parameters is the predetermined value falls within a range between the upper limit set value and lower limit set value.

Thus, in the extraction method, it is possible to determine the quality of the image signal according to the value of the extraction condition at the time point when a certain number of parameters are extracted. As a result, in the case where the image signal contains an insufficient amount of a component corresponding to a biometric subject or where the image signal contains an excessive amount of a noise component other than the biometric subject, it is possible to prevent the parameter obtained from such an image signal from being set as registration data or data to be collated with the registration data. On the other hand, in the case where the image signal has satisfactory quality, a parameter exhibiting adequate discrimination is generated as registration data or data to be collated with the registration data. Thus, authentication accuracy can be improved.

Further, in the extraction method, the Hough transform is used not only as a factor for generating biometric information but also as a factor for use in determining the quality of the image signal, thereby simplifying the configuration of the registration apparatus.

Further, according to a fourth aspect of the present invention, there is provided a program that allows a computer to execute: performing predetermined processing for an image signal obtained as a result of imaging a biometric subject in a predetermined biological position so as to extract a feature portion of the biometric subject in the image signal; performing Hough transform for the feature portion; extracting a parameter obtained as a result of the Hough transform while changing an extraction condition such that the number of the parameters becomes a predetermined value; and setting the predetermined number of the parameters as registration data or data to be collated with the registration data in the case where the value of the extraction condition at the time point when the number of the parameters is the predetermined value falls within a range between the upper limit set value and lower limit set value.

Thus, in the program, it is possible to determine the quality of the image signal according to the value of the extraction condition at the time point when a certain number of parameters are extracted. As a result, in the case where the image signal contains an insufficient amount of a component corresponding to a biometric subject or where the image signal contains an excessive amount of a noise component other than the biometric subject, it is possible to prevent the parameter obtained from such an image signal from being set as registration data or data to be collated with the registration data. On the other hand, in the case where the image signal has satisfactory quality, a parameter exhibiting adequate discrimination is generated as registration data or data to be collated with the registration data. Thus, in the program, authentication accuracy can be improved.

Further, in the program, the Hough transform is used not only as a factor for generating biometric information but also as a factor for use in determining the quality of the image signal, thereby simplifying the configuration of the registration apparatus.

As described above, according to the present invention, it is possible to determine the quality of the image signal according to the value of the extraction condition at the time point when a certain number of parameters are extracted, as well as to use the predetermined number of the parameters extracted when the quality of the image signal is satisfactory as registration data or data to be collated with the registration data, thereby realizing the authentication apparatus, collation apparatus, extraction method, and extraction program capable of improving authentication accuracy with a simple structure.

BEST MODE FOR CARRYING OUT THE INVENTION

Referring to the accompanying drawings, an embodiment of the present invention will be described below.

Figure 1:
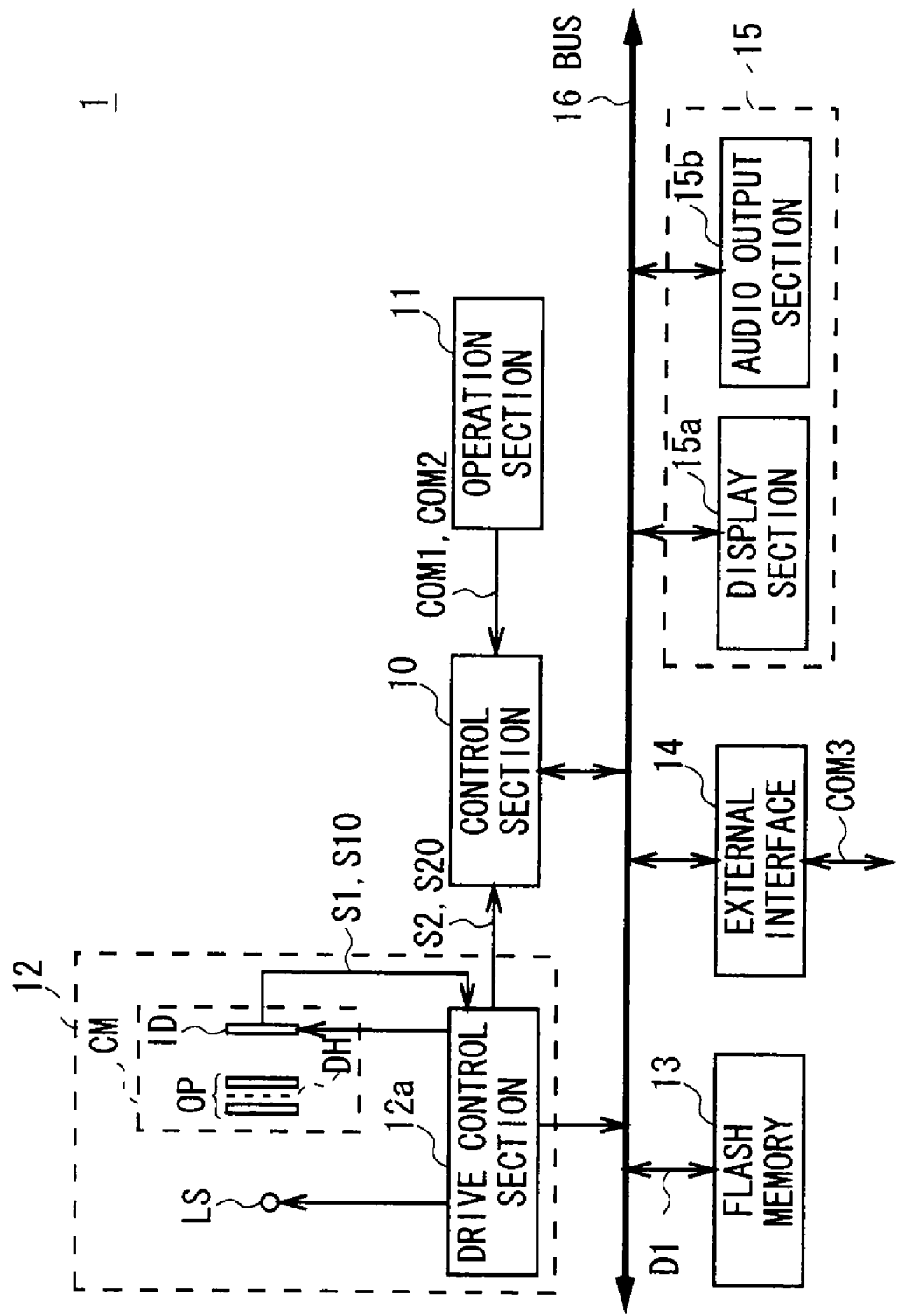
FIG. 1 is a block diagram showing the entire configuration of an authentication apparatus according to an embodiment of the present invention.

(1) Entire Configuration of Authentication Apparatus According to Embodiment of Present Invention FIG. 1 shows the entire configuration of an authentication apparatus 1 according to an embodiment of the present invention. The authentication apparatus 1 is configured by connecting an operation section 11, a blood vessel imaging section 12, a flash memory 13, an interface (hereinafter, referred to as external interface) 14 that transmits and receives data to and from external devices, and a notification section 15, with respect to control section 10 through a bus 16.

The control section 10 is a microcomputer that includes a Central Processing Unit (CPU) that controls the entire authentication apparatus 1, a Read Only Memory (ROM) that stores various programs and setup information, and a Random Access Memory (RAM) as a work memory for the CPU.

To the control section 10, an execution command COM 1 for executing a mode (hereinafter, referred to as blood vessel registration mode) of registering blood vessels of a user (hereinafter, referred to as registrant) to be registered, or an execution command COM 2 for executing a mode (hereinafter, referred to as authentication mode) of determining the existence of the identical registrant is given from the operation section 11 according to the operation of the user.

The control section 10 determines a mode to be executed based on the execution command COM 1 and execution command COM 2, and executes the blood vessel registration mode or the authentication mode by arbitrarily controlling the blood vessel imaging section 12, flash memory 13, external interface 14, and notification section 15 based on a program corresponding to the result of mode determination.

(1-1) Blood Vessel Registration Mode

Specifically, when determining the blood vessel registration mode as a mode to be executed, the control section 10 switches the operation mode to the blood vessel registration mode, and controls the blood vessel imaging section 12.

In this case, a drive control section 12a of the blood vessel imaging section 12 drives and controls one or more near infrared ray sources LS for irradiating a finger placed at a predetermined position of the authentication apparatus 1 with a near infrared ray and an imaging device ID such as a Charged Coupled Device (CCD) of an imaging camera CM.

As a result, in the blood vessel imaging section 12, a near infrared ray irradiated to the finger passes through the inside of the finger to be reflected and scattered therein, and goes into the imaging device ID through an optical system OP and a diaphragm DH as light (hereinafter, referred to as blood vessel projection light) that projects blood vessels of the finger. The imaging device ID carries out photoelectric conversion for the blood vessel projection light and outputs the resultant signal obtained by the photoelectric conversion to the drive control section 12a as an image signal S1.

Practically, some of the near infrared rays irradiated onto the finger are reflected by the surface of the finger before entering the imaging device ID. Therefore, the image of the image signal S1 output from the imaging device ID includes not only the blood vessels in the finger but also the outline and the fingerprint of the finger.

The drive control section 12a adjusts the lens position of the optical lens of the optical system OP so as to bring the blood vessels in the finger into focus and, at the same time, adjusts the aperture value of the diaphragm DH so as to regulate the quantity of incident rays entering the imaging device ID to an appropriate level. Then, the drive control section 12a supplies an image signal S2 output from the imaging device ID after the adjustment to the control section 10.

The control section 10 extracts the feature of the blood vessel contained in the image of the image signal S2 by performing predetermined image processing for the same and stores and registers the extracted feature of the blood vessel in the flash memory 13 as information D1 (hereinafter, referred to as registrant identification data) for identifying the registrant.

Thus, the control section 10 operates in the blood vessel registration mode.

(1-2) Authentication Mode

On the other hand, when determining the authentication mode as a mode to be executed, the control section 10 switches the operation mode to the authentication mode and controls the blood vessel imaging section 12 similar to the case of the above-described blood vessel registration mode.

Then, the blood vessel imaging section 12 drives and controls the near infrared ray source LS and the imaging device ID and, at the same time, adjusts the lens position and the aperture value of the diaphragm DH of the optical lens of the optical system OP according to an image signal S10 output from the imaging device ID and supplies an image signal S20 output from the imaging device ID after the adjustment to the control section 10.

The control section 10 performs the same image processing as that in the above-described blood vessel registration mode for the image signal S20 and, at the same time, reads out the registrant identification data D1 registered in the flash memory 13. Then, the control section 10 collates the extracted feature of the blood vessels extracted by the above image processing and the feature of the blood vessels of the registrant identification data D1 read out from the flash memory 13 and determines whether a user who placed his or her finger is the registrant (qualified user) or not according to the degree of agreement obtained as a result of the collation.

When determining that the finger belongs to the registrant, the control section 10 generates an execution command COM 3 for causing an operation processing apparatus (not shown) connected to the external interface 14 to perform a predetermined operation and transfers the command COM 3 to the operation processing apparatus through the external interface 14.

If the operation processing apparatus connected to the external interface 14 is, for example, a locked door, the control section 10 may transfer the execution command COM 3 for unlocking to the door. If the operation processing apparatus is a computer having a plurality of operation modes, some of which are prohibited, the control section 10 may transfer execution command COM 3 for releasing the prohibited operation modes to the computer.

While two specific examples are listed above for the operation processing apparatus, the embodiment is by no means limited thereto. In other words, the operation processing apparatus can select any other embodiment arbitrarily. While the operation processing apparatus is connected to the external interface 14 in this embodiment, the software or hardware of the operation processing apparatus may be installed in the authentication apparatus 1.

When, on the other hand, determining that the finger does not belong to the registrant, the control section 10 displays the corresponding information on the display section 15a of the notification section 15 and outputs an audio sound from the audio output section 15b of the notification section 15 so as to visibly and audibly issue a notification of determination that the finger does not belong to the registrant.

Thus, the control section 10 operates in the authentication mode in the above-described way.

(2) Specific Processing Operation in Image Processing

Figure 2:
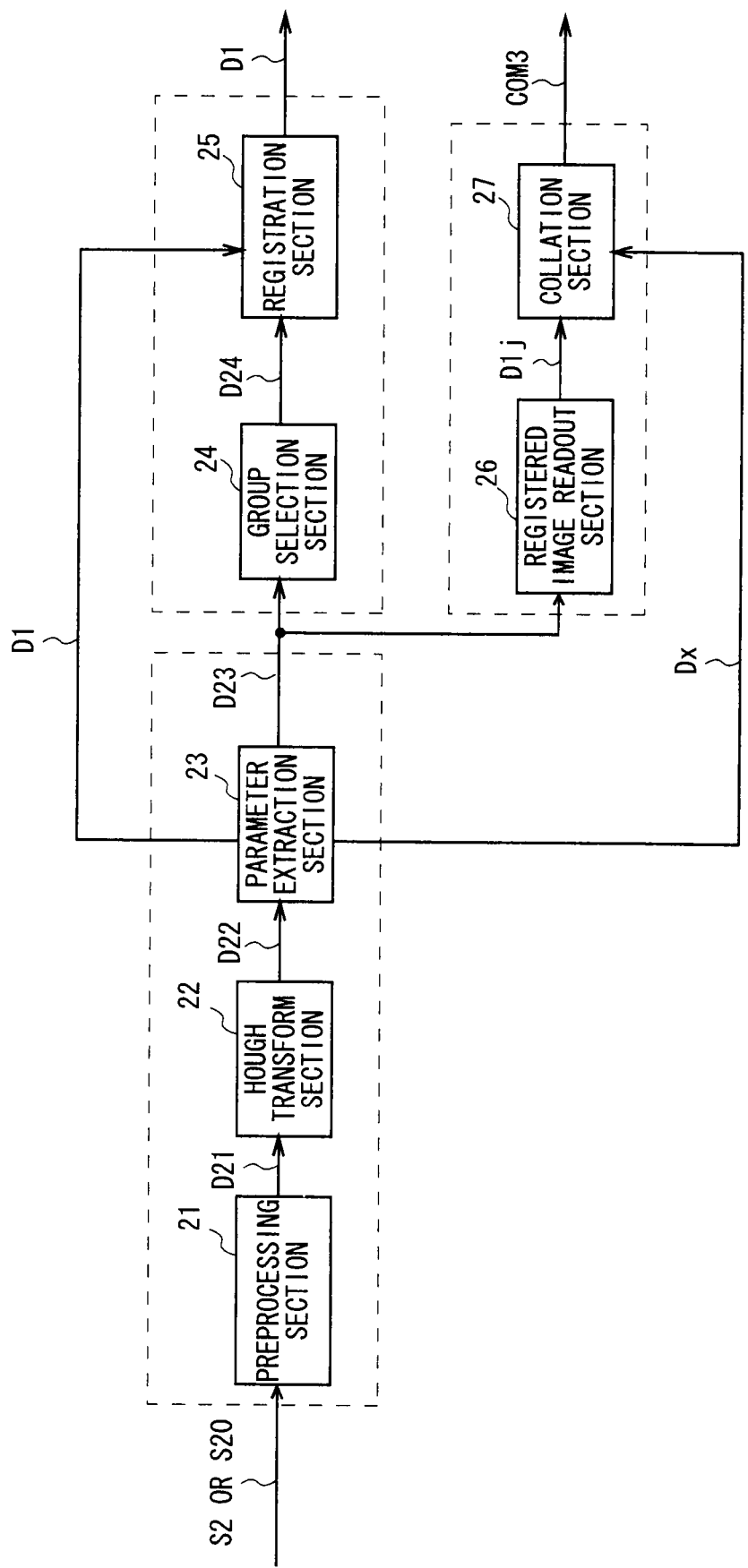
FIG. 2 is a block diagram showing a functional configuration of image processing, registration processing, and collation processing of a control section.

A description will next be given of operation in image processing performed by the control section 10. The image processing of this embodiment can functionally be divided into a preprocessing section 21, a Hough transform section 22, and a parameter extraction section 23, as shown in FIG. 2. In the following, the functions of the preprocessing section 21, Hough transform section 22, and parameter extraction section 23 will be described in detail.

The preprocessing unit 21 sequentially performs, for the image signal S2 or S20 supplied from the blood vessel imaging section 12, Analog/Digital (A/D) conversion processing, predetermined outline extraction processing such as Sobel filer processing, predetermined smoothing processing such as Gaussian filter processing, binarization processing, and skeletonization processing and transmits image data D21 obtained as a result of the above processing to the Hough transform section 22.

The Hough transform section 22 performs Hough transform processing for the image data D21. Here, the Hough transform will briefly be described.

Figure 3:
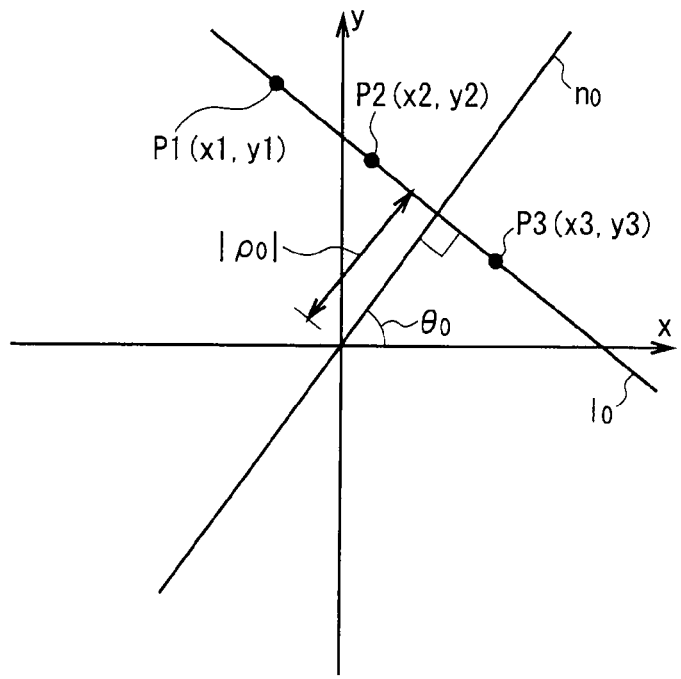
FIG. 3 is a schematic view to help explain expression of a straight line on x-y plane.

As shown in FIG. 3, a straight line $l_0$ on x-y plane can be represented as "$(p_0, \theta_0)$" assuming that a normal line that is perpendicular to the straight line $l_0$ and that passes the original point is $n_0$, angle formed by x-axis and normal line $n_0$ is $\theta_0$, and the distance from the original point to intersecting point between the straight line $l_0$ and normal line $n_0$ is $|p_0|$.

The Hough transform for the x-y plane is defined by the following expression:

$$P = x \cos \theta + y \sin \theta \quad (1)$$

Figure 4:
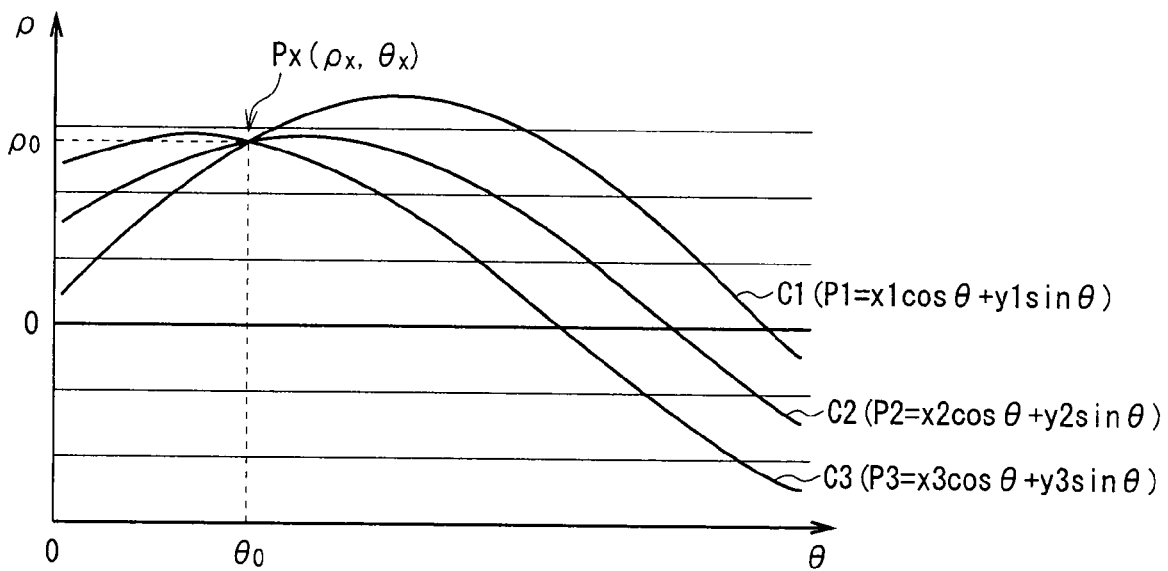
FIG. 4 is a schematic view to help explain expression of points on P-θ space.

In this Hough transform, point P1 $(x_1, y_1)$, point P2 $(x_2, Y_2)$, and point P $(x_1, Y_1)$ on the straight line $l_0$ on x-y plane shown in FIG. 3 are represented respectively as curved lines C1 $(x_1 \cos \theta + y_1 \sin \theta)$, C2 $(x_2 \cos \theta + y_2 \sin \theta)$, and C3 $(x_3 \cos \theta + y_3 \sin \theta)$ on p-θ space, as shown in FIG. 4.

The curved lines C1, C2, and C3 on the p-θ space cross each other at intersecting point P $(P_X, \theta_X)$ The intersection point P corresponds to the straight line $l_0$ on the x-y plane before the Hough transform. The intersection point P is a parameter dependent on the degree of overlapping (number of overlapping points) between the curved lines, so that the number of intersecting points increases or decreases depending on the degree of overlapping.

Therefore, in the Hough transform, it is possible to detect what type of linear component is dominant on the x-y plane before the Hough transform by using a change in the degree of overlapping of the curved lines as an extraction condition.

While FIG. 4 shows a sample image IM1 (FIG. 5(A)), an image IM2 (FIG. 5(B)) obtained by performing the Hough transform for the sample image IM1, an image IM3 (FIG. 5(C)) obtained by rotating the sample image IM1 by a predetermined angle, an image IM4 (FIG. 5(D)) obtained by performing the Hough transform for the sample image IM3, an image IM5 (FIG. 5(E)) obtained by parallel-moving the sample image IM2 by a predetermined amount, and an image IM6 (FIG. 5(F)) obtained by performing the Hough transform for the image IM5. In the images IM2, IM4, and IM6 after the Hough transform, only the points at which the number of overlapping points between the curved lines is large are shown for simplification of explanation.

Figure 5:
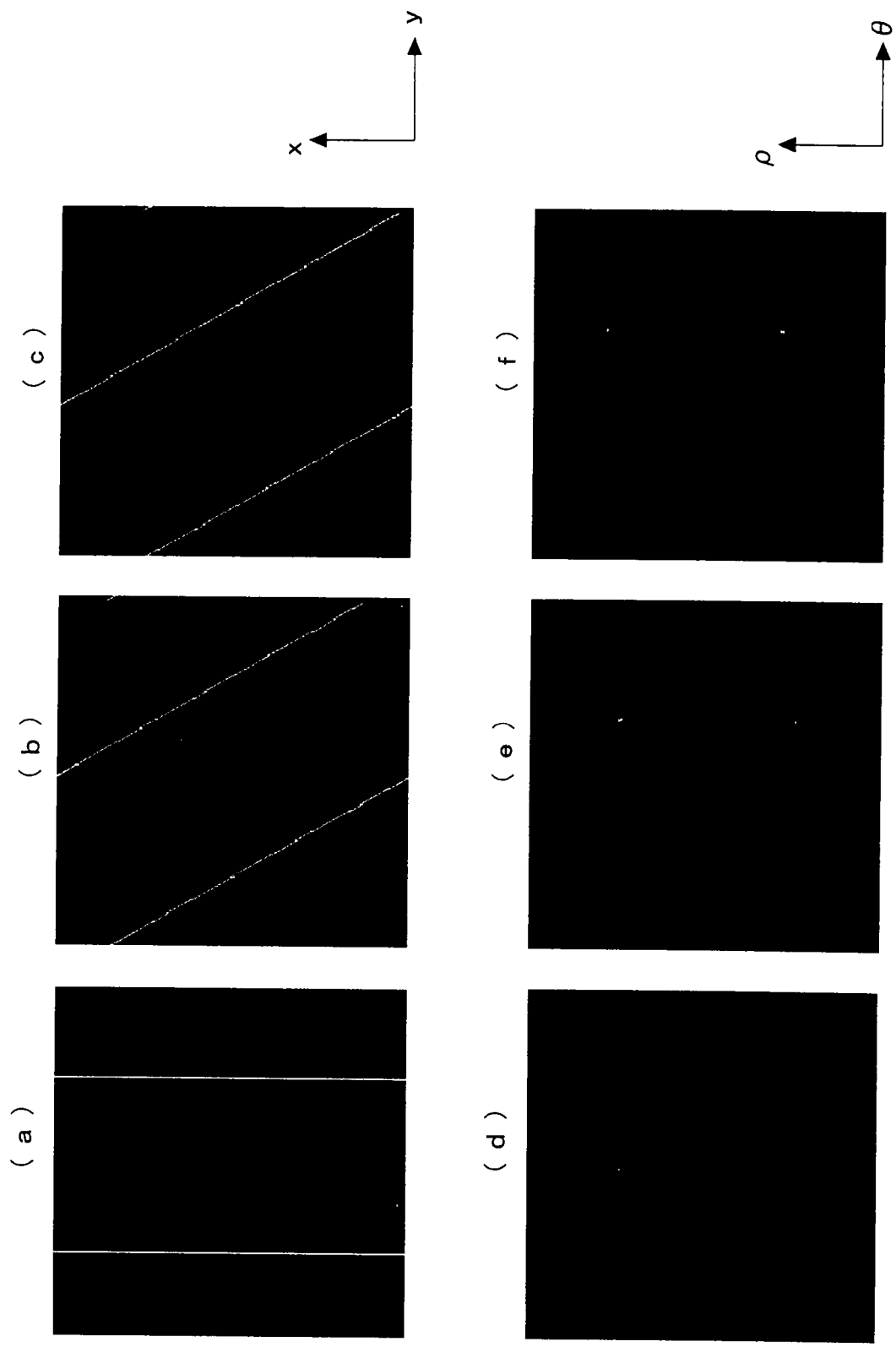
FIGS. 5(a) to 5(f) are schematic views showing sample images and Hough-transformed images corresponding to the sample images.

As is clear from FIG. 5, in either case where the sample image IM1 on the x-y plane is rotated or parallel-moved, the image IM2 only moves in parallel on the p-θ space (FIG. 5(D), FIG. 5(F)).

Thus, in the Hough transform, only by detecting the amount of parallel movement between images, both the amount of rotational movement and amount of parallel movement between images before the Hough transform can be detected.

As described above, in the Hough transform, what type of linear component is dominant on the x-y plane is detected, and it is possible to perform detection in consideration of both the amount of rotational movement and amount of parallel movement between images on the x-y plane.

The Hough transform section 22 performs the Hough transform processing for the image data D21 supplied from the preprocessing section 21 and transmits points (hereinafter, referred to as parameter points) obtained as a result of the Hough transform processing to the parameter extraction section 23 as data (hereinafter referred to as parameter data) D22.

In this manner, the Hough transform section 22 can quantify what type of linear component is dominant in the image by focusing on the fact that the blood vessels in the image have high linearity.

Figure 6:
FIG. 6 is a schematic view showing an input image.
Figure 7:
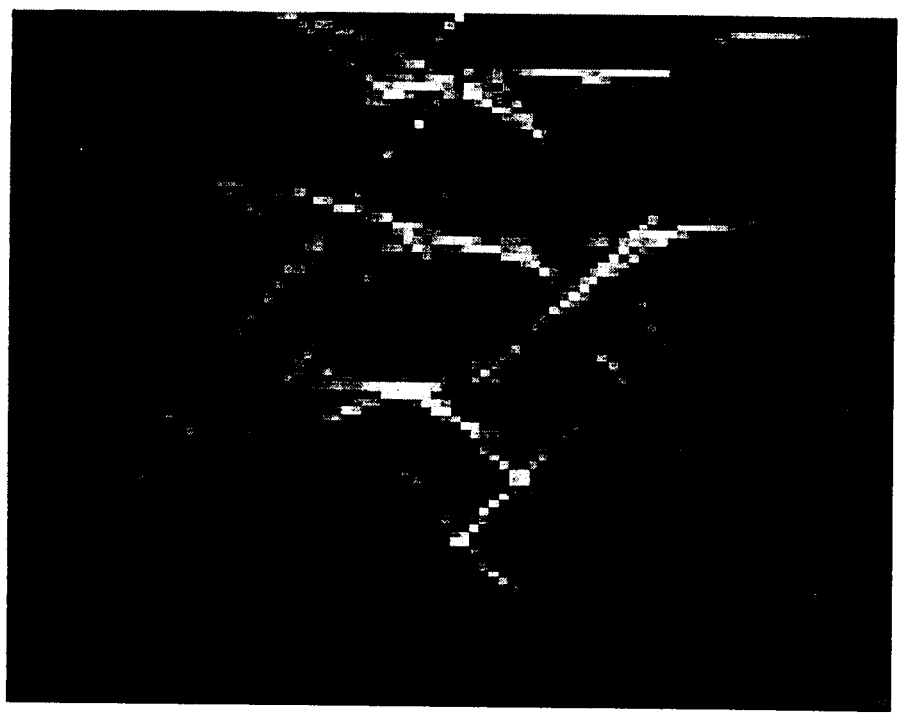
FIG. 7 is a schematic view showing a Hough-transformed image.

In the case where, for example, the image data D21 is an image as shown in FIG. 6, a result of the Hough transform applied to the image data D21 becomes an image as shown in FIG. 7. In the image shown in FIG. 7, the higher the degree of overlapping between curved lines is, the higher the density of the white color portion becomes.

In the parameter extraction section 23, a threshold value (hereinafter, referred to as extraction threshold value) is set in default as an extraction condition such that, for example, a parameter point at which the number of overlapping points between curved lines is not less than "1" is extracted.

The parameter extraction section 23 extracts a parameter point at which the number of overlapping points between curved lines is not less than the extraction threshold value set in default from the parameter points of the parameter data D22 supplied from the Hough transform section 22 and calculates the number of the extracted parameter points.

In the case where the number of the parameter points is not less than a previously specified value (hereinafter, referred to as specified number), the parameter extraction section 23 increases the extraction threshold value such that, for example, a parameter point at which the number of overlapping points between curved lines is not less than "2" is extracted. The parameter extraction 23 re-extracts the parameter points at which the number of overlapping points between curved lines is not less than the increased extraction threshold value and calculates the number of the extracted parameter points.

In this manner, the parameter extraction section 23 increases the extraction threshold value until the number of the parameter points becomes less than the specified number.

Moreover, when the number of the parameter points becomes less than the specified number, the parameter extraction section 23 determines whether the extraction threshold value at this time point falls within a previously set range (hereinafter, referred to as allowable extraction threshold value range) between the upper limit set value and lower limit set value.

When the extraction threshold value falls outside the allowable extraction threshold value range, which means that the quality of an image (image signal S2 or S20) is poor because of an excessive amount of a noise component in the image signal S2 or S20 or an insufficient amount of blood vessel component corresponding to the linear component in the image signal S2 or S20, so the parameter extraction section 23 stops the registration mode and notifies a user that re-registration of the image needs to be made through the notification section 15 (FIG. 1).

On the other hand, the fact that the extraction threshold value falls within the allowable extraction threshold value range means that the quality of an image (image signal S2 or S20) is satisfactory because of a small amount of a noise component in the image signal S2 or S20 or an adequate amount of blood vessel component corresponding to the linear component in the image signal S2 or S20.

In this case, the parameter extraction section 23 generates the extraction threshold value as data (hereinafter, referred to as extraction threshold value data) D23 and, at the same time, generates the detected parameter points corresponding to the specified number as the registrant identification data D1 or data (hereinafter, referred to as person-to-be-collated feature data) Dx representing the feature of the blood vessel of a person to be collated with the registrant identification data D1.

Figure 8:
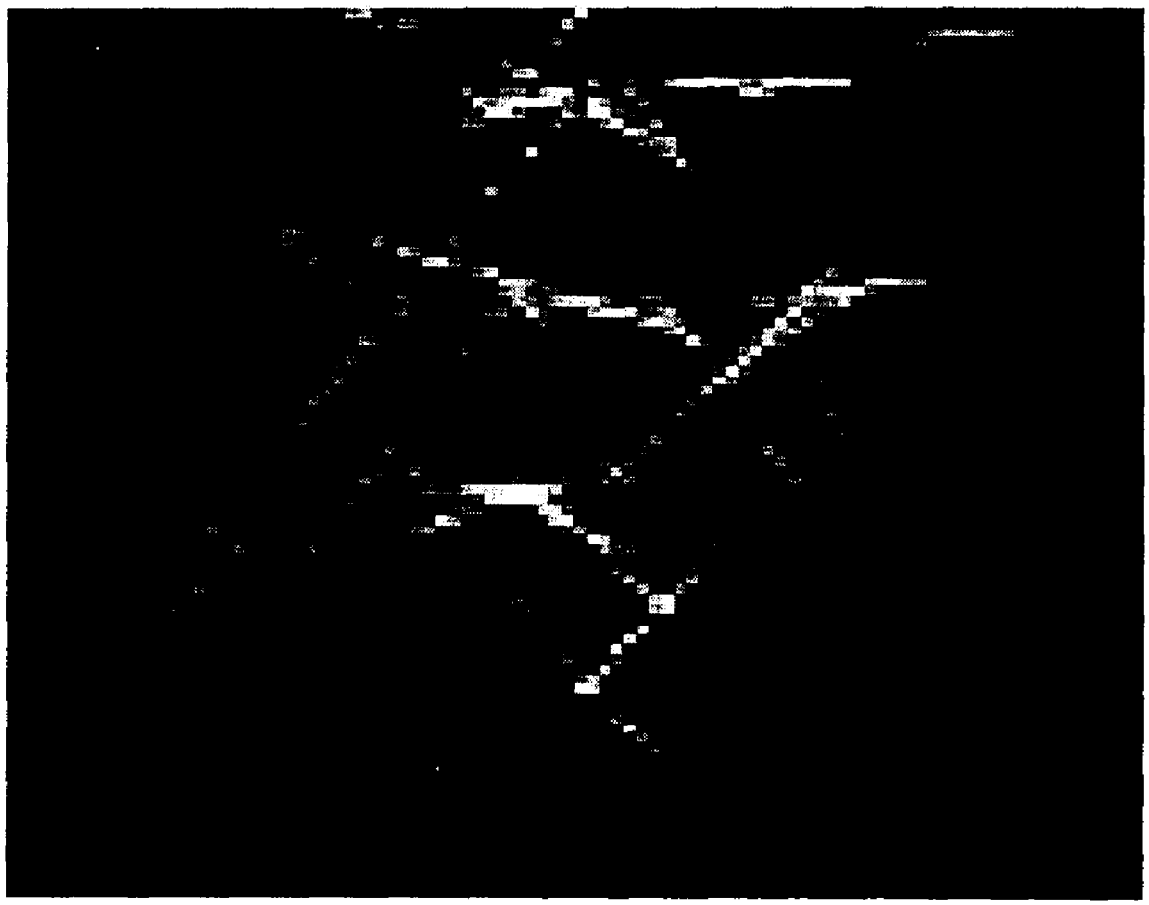
FIG. 8 is a schematic view showing a image after parameter extraction.

In fact, in the case where, for example, the parameter data D22, which has been obtained as a result of the Hough transform, is an image as shown in FIG. 7, the extraction result for the parameter points of the parameter data D22 becomes an image as shown in FIG. 8. Note that, in the image shown in FIG. 8, the higher the degree of overlapping between curved lines is, the higher the density of the white color portion becomes. As is clear from FIG. 8, parameter points resulting from components other than the blood vessel corresponding to the linear component are removed from the image (FIG. 7) obtained as a result of the Hough transform.

That is, the parameter extraction section 23 makes the number of parameter points obtained as a result of the Hough transform constant by changing the extraction condition (extraction threshold value), thereby determining the quality of the image signals S10 and S20, as well as reducing a noise component other than the blood vessel component.

Thus, the control section 10 can execute image processing in the blood vessel registration mode or authentication mode in the above-described way.

(3) Specific Processing Operation in Registration Processing

A description will next be given of operation in registration processing performed by the control section 10. The registration processing of this embodiment can functionally be divided into a group selection section 24 and a registration section 25 of FIG. 2. In the following, the functions of the group selection section 24 and registration section 25 will be described in detail.

In the group section 24, first to third ranges which is obtained by dividing the allowable extraction threshold value range set in the parameter extraction section 23 are set as group ranges (hereinafter, referred to as first group range, second group range, and third group range).

The group selection section 24 recognizes to which one of the first group range, second group range, and third group range the extraction threshold value of the extraction threshold value data D23 supplied from the parameter extraction section 23 belongs and transmits, to the registration section 25, data (hereinafter, referred to as group selection data) D24 representing that a group corresponding to the recognized group range should be selected as a group to be registered.

The registration section 25 registers the registrant identification data D1 supplied from the parameter extraction section 23 in the flash memory 13 (FIG. 1) such that the registrant identification data D1 is registered in a group specified by the group selection data D24 in the first to third groups.

Thus, the control section 10 can classify the registrant identification data D1 into one of the first to third groups according to the extraction threshold value falling within the allowable extraction threshold value range at the registration time in the above-described way.

(4) Specific Processing Operation in Collation Processing

A description will next be given of operation in collation processing performed by the control section 10. The collation processing of this embodiment can functionally be divided into a registered image readout section 26 and a collation section 27 shown in FIG. 2. In the following, the functions of the registered image readout section 26 and collation section 27 will be described in detail.

In the registered image readout section 26, the first to third group ranges which is obtained by dividing the allowable extraction threshold value range set in the parameter extraction section 23 are set respectively. The registered image readout section 26 recognizes to which one of the first to third group ranges the extraction threshold value of the extraction threshold value data D23 supplied from the parameter extraction section 23 belongs.

Then, the registered image readout section 26 selects, from one or more registrant identification data D1 registered in the flash memory 13 (FIG. 1), one or more registrant identification data D1j ("j" indicates the number of data registered) that have been registered as a group corresponding to the group range recognized at this time, and reads out the selected registrant identification data D1j for transmission to the collation section 27.

The collation section 27 collates the registrant identification data D1j with the person-to-be-collated feature data Dx supplied from the parameter extraction section 23 in terms of parameter points, and, when determining that the user who places the finger on the authentication apparatus is a registrant (qualified user) as the collation result, transmits the execution command COM 3 for causing an operation processing apparatus (not shown) to perform a predetermined operation to the external interface 14 (FIG. 1).

In this way, the control section 10 can collate, from the registrant identification data D1 that have previously been classified into groups according to the extraction threshold value falling within the allowable extraction threshold value, only the registrant identification data D1j registered in the group corresponding to the extraction threshold value at the time point when the parameter points of the person-to-be-collated feature data Dx are extracted as data to be collated with the person-to-be-collated feature data Dx.

(5) Authentication Processing Procedure

Figure 9:
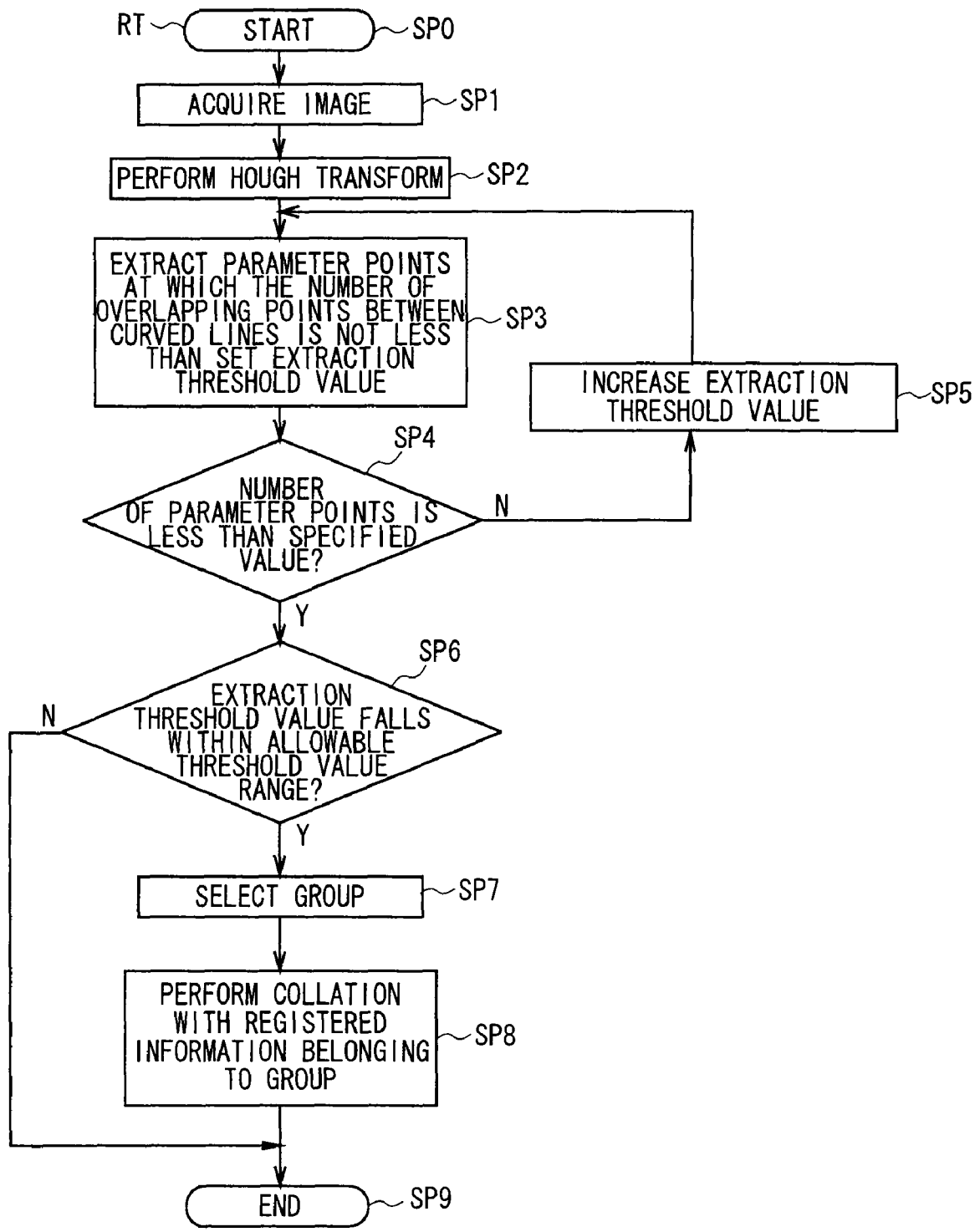
FIG. 9 is a flowchart showing an authentication processing procedure.

Next, a procedure of the authentication processing in the authentication mode out of the blood vessel registration mode or authentication mode performed by the control section 10 will be described using a flowchart shown in FIG. 9.

When receiving the execution command COM 2 from the operation section 11 (FIG. 1), the control section 10 starts an authentication processing sequence RT in step SP0, and then controls the blood vessel imaging section 12 through the drive control section 12a (FIG. 1) in step SP1 to perform preprocessing for the image signal S20 obtained as a result of imaging performed by the blood vessel imaging section 12 to acquire the binary image data D21 (FIG. 2).

Then, in step SP2, the control section 10 performs the Hough transform processing for the image data D21, extracts parameter points which are not less than the extraction threshold value set in default from the parameter points obtained as a result of the Hough transform processing in step SP3, and determines whether the number of the extracted parameters is less than a specified value in step SP4.

In the case where the number of the parameter points is not less than a specified value, the control section 10 increases the default extraction threshold value by a predetermined value in step SP5 and returns to step SP3 where it performs the above processing once again.

On the other hand, in the case where the number of the parameter points is less than a specified value, the control section 10 determines whether the extraction threshold value set in this time falls within an allowable extraction threshold value range in step SP6.

In the case where the extraction threshold value falls within the allowable extraction threshold value range, the control section 10 determines whether the acquired image is an image (image signal S20) of satisfactory quality and selects one group from the first to third groups according to the set extraction threshold value in step SP7.

Then, in subsequent step SP8, the control section 10 collates parameter points of one or more registrant identification data D1j registered (FIG. 2) as the group with parameter points whose number is less than the specified value which is detected in step SP3 and then advances to step SP9 where the control section 10 ends this authentication processing procedure RT. Note that, in the case of the blood vessel registration mode, in this step SP8, the control section 10 registers the parameter points whose number is less than the specified value which is detected in step SP3 in the group selected in step SP7.

On the other hand, in the case where the extraction threshold value set at the time point when the number of the parameter values is less than the specified value falls outside a previously set allowable extraction threshold value range, the control section 10 determines whether the acquired image is an image (image signal S20) of poor quality and notifies a user that the authentication mode needs to be performed from the beginning through the notification section 15 (FIG. 1). Subsequently, the control section advances to step SP9 to finish the authentication processing procedure RT.

According to the above authentication processing procedure RT, the control section 10 can execute the authentication mode.

(6) Operation and Effects

With the abovementioned configuration, the authentication apparatus 1 performs predetermined preprocessing for the image signal S2 or S20 (FIG. 2) obtained as a result of imaging a finger and then performs the Hough transform processing for the same. Subsequently, the authentication apparatus 1 increases and sets the extraction condition (extraction threshold value) until the number of the parameter points obtained as a result of the Hough transform processing becomes less than the specified number and extracts the parameter points not less than the value specified in the set extraction condition (extraction threshold value).

Then, when the value of the extraction condition (extraction threshold value) at the time point when the number of the parameter points becomes less than the specified value falls within the allowable threshold value range, the authentication apparatus 1 sets the parameter points as registration data or data to be collated with the registration data.

Thus, in the authentication apparatus 1, in the case where the image signal S2 or S20 contains an insufficient amount of a component corresponding to a biometric subject or where the image signal S2 or S20 contains an excessive amount of a noise component other than the biometric subject, the value of the extraction condition (extraction threshold value) at the time point when the parameter points whose number is less than the specified value are extracted from the image signal S2 or S20 falls outside the allowable threshold value range.

On the other hand, in the case where the image signal S2 or S20 contains an adequate amount of a component corresponding to the biometric subject or where the image signal S2 or S20 contains a small amount of a noise component other than the biometric subject, the value of the extraction condition (extraction threshold value) at the time point when the parameter points whose number is less than the specified value are extracted from the image signal S2 or S20 falls within the allowable threshold value range. Thus, the authentication apparatus 1 can determine the quality of the image signal S2 or S20 according to the value of the extraction condition at the time point when a certain number of parameters are extracted. As a result, parameter points capable of exhibiting adequate image discrimination can be used as registration data or data to be collated with the registration data.

Particularly, in the case where a unit for blocking a light (ambient light incident to a finger placed on a predetermined position) such as a visible light other than a near infrared ray irradiated onto the finger placed in the predetermined position is not provided in the blood vessel imaging section 12 (FIG. 1) in the authentication apparatus 1, illuminance on the finger placed on a predetermined position may often vary depending on the imaging environment or imaging condition.

Accordingly, in such a case, the determination of quality of the image signal S2 or S20 made based on the Hough transform result is especially effective.

Further, in the authentication apparatus 1, the parameter points obtained as a result of the Hough transform are used not only as a factor for use in determining the quality of the image signal S2 or S20 but also as a factor for generating biometric information. As a result, common use of a part of configurations of the image quality determination and biometric information generation can be achieved, thereby simplifying the configuration of the authentication apparatus 1.

Further, when the extraction condition (extraction threshold value) at the time point when the number of the parameter points becomes less than a specified value falls within the allowable threshold value range, the authentication apparatus 1 registers the predetermined number of parameters in one of a plurality of groups that corresponds to the value of the extraction condition at the registration time; and, at the collation time, collates the predetermined number of parameters with the parameter points registered as a group corresponding to the value of the extraction condition.

Thus, in the authentication apparatus 1, as data to be collated with the parameter points extracted at the collation time, only the registration data that have been registered in a group corresponding to the extraction threshold at the time point of the extraction are selected from the registration data that have been classified into groups. As a result, it is possible to avoid blanket collation of all the registration data, thereby correspondingly reducing a processing load at the time of the collation.

Further, in the authentication apparatus 1, the parameter point extraction condition is used not only as a factor for use in determining the quality of the image signal S2 or S20 but also as a factor for use in determination of the grouping. As a result, common use of a part of configurations of the image quality determination and grouping can be achieved, thereby simplifying the configuration of the authentication apparatus 1.

With the abovementioned configuration, it is possible to determine the quality of the image signal S2 or S20 according to the extraction condition at the time point when the specified number of the parameter points are extracted as well as to use the specified number of the parameter points extracted when the quality of the image signal S2 or S20 is satisfactory as registration data or data to be collated with the registration data, thereby realizing the authentication apparatus 1 capable of improving authentication accuracy with a simple structure.

(7) Other Embodiments

While a finger is used as a site of biometric observation in the above-described embodiment, the present invention is by no means limited thereto and a palm, a toe, an arm, an eye, or the like may alternatively used as a site of biometric observation.

While blood vessels are used as biometric subject in the above-described embodiment, the present invention is by no means limited thereto and a fingerprint, a lip print, nerves, or the like may alternatively be used. When nerves are used, an idiosyncratic marker is injected into the body to make it possible to photograph the marker. Then, it is possible to use nerves as biometric subject as in the case of the above-described embodiment.

While the A/D conversion processing, outline extraction processing, smoothing processing, binarization processing, and skeletonization processing are executed to extract feature of a biometric subject from image signals in the above-described embodiment, the present invention is by no means limited thereto and alternatively the above processing may be partly omitted or replaced, or new processing may be added. The sequence of execution of these processes may be changed appropriately.

While the registrant identification data D1 is registered in one of the three groups, the number of groups is not limited to three, but may be any arbitrary number.

While the authentication apparatus 1 of the above-described embodiment has an imaging feature, a collation feature and a registration feature, the present invention is by no means limited thereto and the above-listed features may be realized respectively by separate apparatus with various embodiments for purposes.

INDUSTRIAL APPLICABILITY

The present invention can be utilized in the field of the biometrics authentication.

EXPLANATION OF REFERENCE SYMBOLS

1 ... AUTHENTICATION APPARATUS, 10 ... CONTROL SECTION, 11 ... OPERATION SECTION, 12 ... BLOOD VESSEL IMAGING SECTION, 12a ... DRIVE CONTROL SECTION, 13 ... FLASH MEMORY, 14 ... EXTERNAL INTERFACE, 15 ... NOTIFICATION SECTION, 15a ... DISPLAY SECTION, 15b ... AUDIO OUTPUT SECTION, 21 ... PREPROCESSING SECTION, 22 ... HOUGH TRANSFORM SECTION, 23 ... PARAMETER EXTRACTION SECTION, 24 ... GROUP SELECTION SECTION, 25 ... REGISTRATION SECTION, 26 ... REGISTERED IMAGE READOUT SECTION, 27 ... COLLATION SECTION, LS ... NEAR INFRARED RAY SOURCE, CM ... IMAGING CAMERA, OP ... OPTICAL SYSTEM, DH ... DIAPHRAGM, ID ... IMAGING DEVICE, RT ... AUTHENTICATION PROCESSING PROCEDURE

The invention claimed is:

1. A registration apparatus, comprising:
a biometric image acquiring section that acquires a biometric image in a biological region;
a converting section that converts the biometric image into linear component information that respectively indicates a quantity of each linear component of a plurality of linear components;
an extracting section that extracts, from the linear component information, linear components related to parameter points at which curved lines, corresponding to the linear component information, overlap, a number of overlapping curved lines at each of the parameter points being larger than an extraction threshold value;
a determining section that determines whether a number of the extracted linear components that are larger than the extraction threshold value is as much as a specified number;
a threshold value change setting section that increases the extraction threshold value each time the determining section determines that the number of the extracted linear components is as much as the specified number and when the extraction threshold value does not fall within an allowable extraction threshold value range, such that the extracting section iteratively extracts the linear components based on the increased extraction threshold value; and
a biometric information registration section that registers a piece of biometric information corresponding to the biometric image to a storing section in the case where the determining section determines that the number of the linear components is as much as the specified number and the increased extraction threshold value falls within the allowable extraction threshold value range.

2. The registration apparatus according to claim 1, wherein the converting section performs a Hough transform for the biometric image.

3. The registration apparatus according to claim 1, wherein the threshold value change setting section that changes the extraction threshold value in the case where the determining section determines that the number of the linear components is not as much as the specified number.

4. The registration apparatus according to claim 1, further comprising: an extraction threshold value registration section that registers the extraction threshold value set in the extraction section to a storing section in the case where the determining section determined that the number of the linear components is as much as the specified number.

5. The registration apparatus according to claim 1, further comprising:
a second determining section that determines whether the extraction threshold value set in the extraction section falls within the allowable extraction threshold value range that is bounded by an upper limit set value and a lower limit set value in the case where the determining section determined that the number of the linear components is as much as the specified number.

6. The registration apparatus according to claim 1, wherein the biometric image is an image on which blood vessels are exposed.

7. A registration apparatus, comprising:
a biometric image acquiring section that acquires a biometric image in a biological region;
a converting section that performs a Hough transform for the biometric image;
extracting means for iteratively extracting, from linear component information obtained as a result of the Hough transform, linear components related to parameter points at which curved lines, corresponding to the linear component information, overlap, a number of overlapping curved lines at each of the parameter points being larger than an extraction threshold value, an iteration of the extracting occurring for an initial extraction threshold value and each time the extraction threshold value is increased, the extraction threshold value being increased each time a number of the extracted linear components is determined to be as much as a specified number; and
a biometric information registration section that registers a piece of biometric information corresponding to the biometric image when the number of the extracted linear components is as much as the specified number and the increased extraction threshold value falls within an allowable extraction threshold range bounded by an upper limit set value and a lower limit set value.

8. An authentication apparatus, comprising:
a readout section that reads out registration information registered in a storing section;

an acquiring section that acquires authentication information to be authenticated; and a determining section that determines whether a contributor of the authentication information is a registrant corresponding to a degree of collation between the registration information and the authentication information, wherein the registration information registered in the storing section is obtained from a registration apparatus that obtains a biometric image acquired from a biological region, transforms the biological image, iteratively extracts, from linear component information obtained as a result of the transform, linear components related to parameter points at which curved lines, corresponding to the linear component information, overlap, a number of overlapping curved lines at each of the parameter points being larger than an extraction threshold value, an iteration of the extracting occurring for an initial extraction value and each time the extraction threshold value is increased, the extraction threshold value being increased each time a number of the extracted linear components is determined to be as much as a specified number, and registers a piece of biometric information corresponding to the biometric image when the number of the extracted linear components is as much as the specified number and the increased extraction threshold value falls within an allowable extraction threshold range bounded by an upper limit set value and a lower limit set value.

9. The authentication apparatus according to claim 8, further comprising: an extraction threshold value acquiring section that acquires an extraction threshold value used when the number of the extracted linear components is larger than the extraction threshold value, and is used for determining whether the contributor is the registrant.

10. A registration and authentication process that determines whether a user is a registered user, comprising:

acquiring, by a registration apparatus, a biometric image in a biological region;

transforming the biometric image;

iteratively extracting, from linear component information obtained as a result of the transform, linear components related to parameter points at which curved lines, corresponding to the linear component information, overlap, a number of overlapping curved lines at each of the parameter points being larger than an extraction threshold value, an iteration of the extracting occurring for an initial extraction value and each time the extraction threshold value is increased, the extraction threshold value being increased each time a number of the extracted linear components is determined to be as much as a specified number; and registering a piece of biometric information corresponding to the biometric image when the number of the extracted linear components is as much as the specified number and the increased extraction threshold value falls within an allowable extraction threshold range bounded by an upper limit set value and a lower limit set value; and determining whether the user is the registered user based on a degree of collation between the registered piece of biometric information and authentication information from the user.

11. The registration process according to claim 10, wherein an extraction threshold value used when the number of the extracted linear components is larger than the extraction threshold value, and is used for determining whether the user is the registered user.

12. A non-transitory computer-readable storage medium having computer readable program codes embodied in the computer readable storage medium that determine whether a user is a registered user, and when executed cause a computer to execute:

acquiring, by a registration apparatus, a biometric image in a biological region;

transforming the biometric image;

iteratively extracting, from linear component information obtained as a result of the transform, linear components related to parameter points at which curved lines, corresponding to the linear component information, overlap, a number of overlapping curved lines at each of the parameter points being larger than an extraction threshold value, an iteration of the extracting occurring for an initial extraction value and each time the extraction threshold value is increased, the extraction threshold value being increased each time a number of the extracted linear components is determined to be as much as a specified number; and registering a piece of biometric information corresponding to the biometric image when the number of the extracted linear components is as much as the specified number and the increased extraction threshold value falls within an allowable extraction threshold range bounded by an upper limit set value and a lower limit set value; and determining whether the user is the registered user based on a degree of collation between the registered piece of biometric information and authentication information from the user.

13. The non-transitory computer-readable storage medium according to claim 12, wherein an extraction threshold value used when the number of the extracted linear components is larger than the extraction threshold value, and is used for determining whether the user is the registered user.

14. The registration apparatus according to claim 1, wherein outline extraction processing including Sobel filter processing is performed on the biometric image.

15. The registration apparatus according to claim 1, wherein the biological region corresponds to a lip print.

* * * * *